(12) United States Patent
Page et al.

(10) Patent No.: US 6,357,540 B1
(45) Date of Patent: Mar. 19, 2002

(54) ROTARY DRILL BIT WITH LIP SEAL IN ROLLER CONE BIT

(75) Inventors: Nigel M. Page, Waterlooville; Philip D. Embury, Woking, both of (GB)

(73) Assignees: Halliburton Energy Services, Inc.; James Walker Co., Ltd. (GB)

( * ) Notice: Subject to any disclaimer, the term of this patent is extended or adjusted under 35 U.S.C. 154(b) by 0 days.

(21) Appl. No.: 09/326,944

(22) Filed: Jun. 7, 1999

(51) Int. Cl.[7] ............................................... E21B 10/00
(52) U.S. Cl. ..................... 175/371; 384/96; 384/484; 277/353; 277/944
(58) Field of Search .................. 175/57, 331, 359, 175/371; 76/108.4; 277/353, 944; 384/94, 96, 484

(56) References Cited

U.S. PATENT DOCUMENTS

| | | | |
|---|---|---|---|
| 3,361,494 A | | 1/1968 | Galle |
| 4,194,795 A | * | 3/1980 | Rife |
| 4,200,343 A | * | 4/1980 | Highsmith |
| 4,224,144 A | | 9/1980 | Zitz et al. |
| 4,252,330 A | * | 2/1981 | Crow |
| 4,253,710 A | * | 3/1981 | Goodman |
| 4,256,351 A | * | 3/1981 | Langford |
| 4,277,109 A | | 7/1981 | Crow |
| 4,344,629 A | | 8/1982 | Oelke |
| 4,452,539 A | | 6/1984 | Evans et al. |
| 4,494,749 A | * | 1/1985 | Evans |
| 4,610,319 A | * | 9/1986 | Kalsi |
| 4,613,004 A | * | 9/1986 | Shotwell |
| 4,619,534 A | * | 10/1986 | Daly et al. ............... 175/371 X |
| 4,623,028 A | * | 11/1986 | Murdoch et al. ........... 175/371 |
| 5,518,077 A | * | 5/1996 | Blackman et al. ...... 175/371 X |

* cited by examiner

Primary Examiner—Roger Schoeppel
(74) Attorney, Agent, or Firm—Groover & Associates; Robert Groover; Betty Formby

(57) ABSTRACT

A roller-cone drill bit in which a double lip seal, made of a self-lubricating elastomer, protects the bearings from the mud.

12 Claims, 8 Drawing Sheets

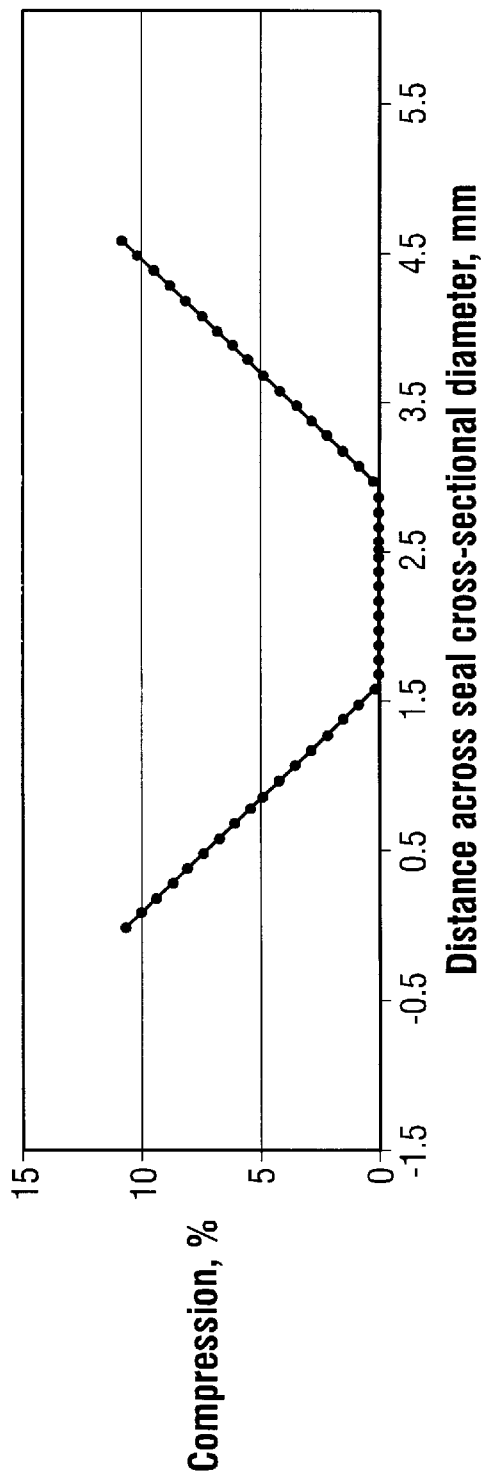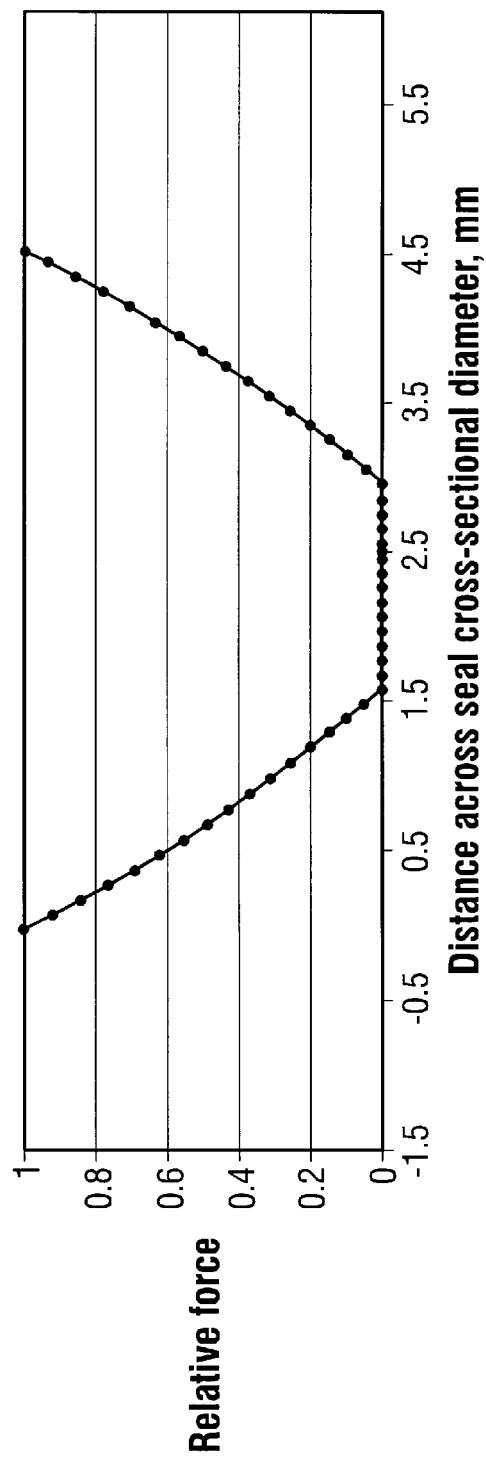

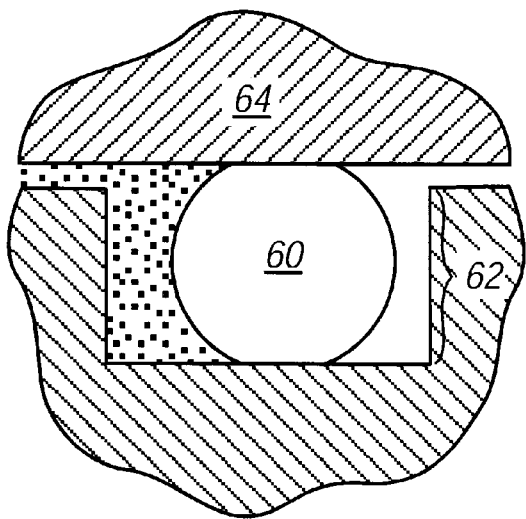
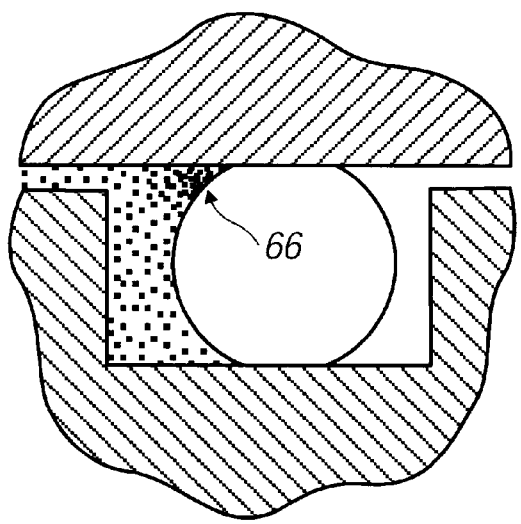
FIG. 6A
(PRIOR ART)
FIG. 6B
(PRIOR ART)
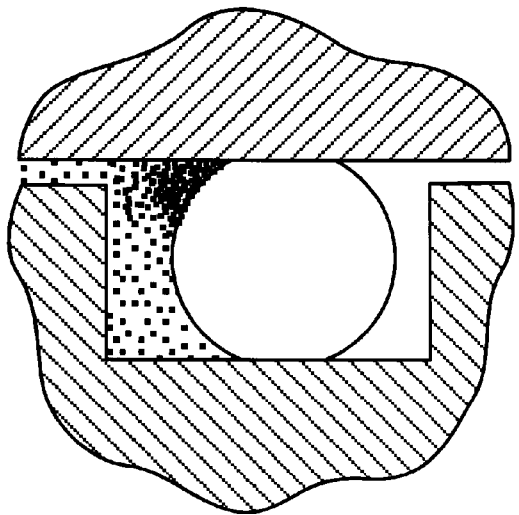
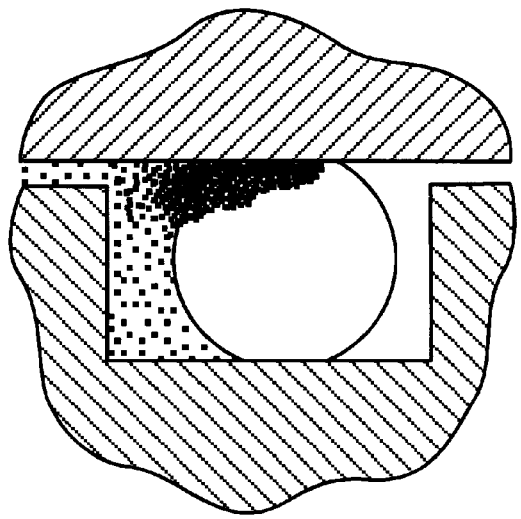
FIG. 6C
(PRIOR ART)
FIG. 6D
(PRIOR ART)

ROTARY DRILL BIT WITH LIP SEAL IN ROLLER CONE BIT

BACKGROUND AND SUMMARY OF THE INVENTION

The present invention relates to bits, methods, and systems for roller cone drilling, and specifically to sealing technology.

Background: Rotary Drilling

Oil wells and gas wells are drilled by a process of rotary drilling. In a conventional drill rig, as seen in FIG. 5 a drill bit 50 is mounted on the end of a drill string 52, made of many sections of drill pipe, which may be several miles long. At the surface a rotary drive turns the string, including the bit at the bottom of the hole, while drilling fluid (or "mud") is pumped through the string by very powerful pumps 54.

The bit's teeth must crush or cut rock, with the necessary forces supplied by the "weight on bit" (WOB) which presses the bit down into the rock, and by the torque applied at the rotary drive. While the WOB may in some cases be 100,000 pounds or more, the forces actually seen at the drill bit are not constant: the rock being cut may have harder and softer portions (and may break unevenly), and the drill string itself can oscillate in many different modes. Thus the drill bit must be able to operate for long periods under high stresses in a remote environment.

When the bit wears out or breaks during drilling, it must be brought up out of the hole. This requires a process called "tripping": a heavy hoist pulls the entire drill string out of the hole, in stages of (for example) about ninety feet at a time. After each stage of lifting, one "stand" of pipe is unscrewed and laid aside for reassembly (while the weight of the drill string is temporarily supported by another mechanism). Since the total weight of the drill string may be hundreds of tons, and the length of the drill string may be tens of thousands of feet, this is not a trivial job. One trip can require tens of hours and is a significant expense in the drilling budget. To resume drilling the entire process must be reversed. Thus the bit's durability is very important, to minimize round trips for bit replacement during drilling.

Background: Drill Bits

One of the most important types of rotary drill bits commonly used in drilling for oil and gas is the roller cone bit, seen in FIG. 8. In such bits, a rotating cone 82 with teeth 84 on its outer surface is mounted on an arm 46 of the drill bit body. The arms 46 (typically three) extend downhole from the bit body, and each carries a spindle on which the cone is mounted with heavy-duty bearings. The support arms are roughly parallel to the drill string, but the spindles are angled to point radially inward and downhole.

As the drill bit rotates, the roller cones roll on the bottom of the hole. The weight-on-bit forces the downward pointing teeth of the rotating cones into the formation being drilled, applying a compressive stress which exceeds the yield stress of the formation, and thus inducing fractures. The resulting fragments are flushed away from the cutting face by a high flow of drilling fluid.

The drill string typically rotates at 150 rpm or so, and sometimes as high as 1000 rpm if a downhole motor is used, while the roller cones themselves typically rotate at a slightly higher rate. At this speed the roller cone bearings must each carry a very bumpy load which averages a few tens of thousands of pounds, with the instantaneous peak forces on the bearings several times larger than the average forces. This is a demanding task.

Background: Bearing Seals

In most applications where bearings are used, some type of seal, such as an elastomeric seal, is interposed between the bearings and the outside environment to keep lubricant around the bearings and to keep contamination out. In a rotary seal, where one surface rotates around another, some special considerations are important in the design of both the seal itself and the gland into which it is seated. For instance, the conventional wisdom is that an elastomeric seal of the O-ring type should be under compressive stress (never under tensile stress), and while there should be enough contact stress between the seal and the rotating surface to prevent leakage, the contact stress should be minimized to reduce friction and wear. Additionally, there should be enough room in the gland to allow for expansion under changing conditions but not excessive room which could allow the seal to twist or buckle. Additional information regarding seals can be found in Leonard J. Martini, Practical Seal Design, (1984) and in Seals and Sealing Handbook (4.ed. M. Brown 1995), both of which are hereby incorporated by reference.

The special demands of sealing the bearings of roller cone bits are particularly difficult. The drill bit is operating in an environment where the turbulent flow of drilling fluid, which is loaded with particulates of crushed rock, is being driven by hundreds of pump horsepower. The flow of mud from the drill string may also carry entrained abrasive fines. The mechanical structure around the seal is normally designed to limit direct impingement of high-velocity fluid flows on the seal itself, but some abrasive particulates will inevitably migrate into the seal location.

For sealing on a rock bit, an O-ring, or a derivative of O-ring, is typically used. As the bit is operated, the seal will inevitably wear and fail, allowing the abrasive drilling fluid to quickly destroy the bearings. Even though the seals may be physically small, their longevity is often a key limitation in the lifetime of an expensive drill bit. Improvement in roller cone bit seal technology is therefore a very important factor.

Additionally, since the bearings of a roller cone bit have to operate at temperatures from room temperature up to several hundred degrees Fahrenheit, the bearings must be designed with a significant running clearance. This clearance, combined with the vertical and lateral forces on the bit, may require some flexure in the seal. The seal material must be able to flex elastically within the range defined by normal runout of the bearings, while still excluding drilling fluids.

FIG. 6A shows schematically an example of a conventional O-ring seal installed in its equilibrium position. (This Figure shows a cross-section through the seal in its installed position.) In this example, the seal 60 sits in a groove 62 (referred to as a "gland"). The seal makes a sliding contact to a sealing surface, which in this example is a cylindrical journal 64. The O-ring, while it lasts, will prevent the drilling fluid on the left side of the drawing from contaminating the lubricant on the right side of the drawing.

Before it is installed, the O-ring has a circular cross-section. However, FIG. 6A shows that the O-ring in its installed state is squashed into a flattened oval shape. The seal performs its sealing function by exerting contact stress on the sealing surfaces.

The O-ring is most deformed in the center of the flattened part. FIG. 4A shows three sample compression profiles for a particular installation. (The central profile is for nominal compression, where the dimensions of the O-ring and the seal housing are exactly as expected; the upper profile is for maximum compression, where the O-ring is a maximum size and/or the seal gap is a minimum size according to the accepted tolerances and the bottom profile is for minimum compression.) In each of these three cases, it can be seen that the compression is highest in the approximate center of the O-ring's cross-section.

FIG. 4B shows the force profile for the middle curve of FIG. 4A. The force is highest at the middle of the sealing area's width, and is zero at the edges. Thus the "exclusion point," where the seal has its maximum resistance to fluid incursion, is at the center of the sealing area. This is also true of the many modifications of elastomer O-ring seals which have been proposed.

Several fundamental problems have been identified with O-ring-type seals in a rock bit application, and can cause various types of failure in the seal.

One type of failure is shown in FIGS. 6B–D. Particles of abrasive materials (fines and sediments) will tend to accumulate as an abrasive mass 66 at the edge of the O-ring, as seen in the left portion of FIG. 6B. This abrasive mass will abrade the O-ring-type seal, as seen in FIG. 6C, until it eventually reduces the sealing area of the O-ring seal and causes failure, seen in FIG. 6D.

A second type of failure is demonstrated in FIG. 7. In this drawing, the lubrication of the seal is insufficient to prevent adhesion, causing adhesion of the seal to the surface across which it is moving. The successive adhesion and dehesion shown in this figure is known as the Schallamach effect. This adhesion problem leads to frictional heating, tearing and cracking of the seal.

Bits, Methods, and Systems for Drilling with Lip Seal in Roller Cone Bit

The present application describes a radically new sealing technology for use in roller cone type rock bits. Instead of a seal having a smooth contact (with the exclusion point therefore located away from the seal edge), the present application teaches that an elastomer seal which provides high sealing force at its edge should be used instead, such as the seal shown in FIG. 1. With such a seal, the line of contact along a relatively sharp edge of the sealing surface provides rigorous exclusion of the abrasive-loaded drilling fluid from the interface between the seal and the journal, with the accumulation of abrasive materials away from the sealing surface. (Thus such a seal is more analogous to a lip seal than to a conventional O-ring-type seal.) In the preferred embodiment, this seal design produces a force profile which is OPPOSITE to that of a conventional O-ring-type seal: the sealing force is maximal at the edge of the sealing surface, and minimal in the middle of the sealing surface.

The compressive pre-load in particular can maintain the dynamic seal against a pressure differential across opposite sides of the seal structure.

In the most preferred embodiments, both edges of the seal are configured as oppositely-directed lip seals. The use of two exclusion points in combination provides a tightly controlled flow of lubricant.

A notable feature of some embodiments (though not necessarily of all embodiments) is that the edge portion of the seal is actually under tensile stress in some dimensions, but it is preferred that it is pre-loaded so that it is in compression.

In some embodiments, the seal dimensions are chosen so that the inner diameter of the seal, before installation, would be larger than the outside diameter of the journal. In these embodiments the gland dimensions are chosen to provide inward compression of the seal's diameter. This force transfer also helps to hold the outer diameter of the seal firmly against the inner diameter of the gland. Additionally, surface area differences between the back of the seal and the lip contact zone ensure that the seal will not rotate in the gland.

In some embodiments, the two lips of the seal define an interior cavity which retains some lubricant. This cavity helps to assure adequate lubrication in the context of a tightly controlled flow of lubricant.

The disclosed innovations, in various embodiments, can provide one or more of at least the following advantages:

Extending the life of seals in roller cone rock bits;

Eliminating seal failure as the limiting factor in roller cone rock bit lifetime;

Avoiding abrasive and adhesive modes of roller cone rock bit seal failure; and

Reducing heat generation at the seal interface.

Another advantage of the innovative seal design, in some embodiments, is that it can be retrofitted into existing journal and gland designs. However, it is believed to be preferable, though not necessary, to use a gentler chamfer on the journal to ease assembly of the more fragile lip seal onto the journal.

BRIEF DESCRIPTION OF THE DRAWING

The disclosed inventions will be described with reference to the accompanying drawings, which show important sample embodiments of the invention and which are incorporated in the specification hereof by reference, wherein:

FIG. 2A shows a partial cutaway of a cone/journal assembly which uses the disclosed seal, while

FIGS. 3A–B show a compression profile and a force profile for the disclosed seal.

FIGS. 6A–D show a conventional O-ring seal in use, with the accumulation of particulates under the edge of the seal and abrasion of the seal.

DETAILED DESCRIPTION OF THE PREFERRED EMBODIMENTS

The numerous innovative teachings of the present application will be described with particular reference to the presently preferred embodiment (by way of example, and not of limitation).

First Embodiment

Figure 1A:
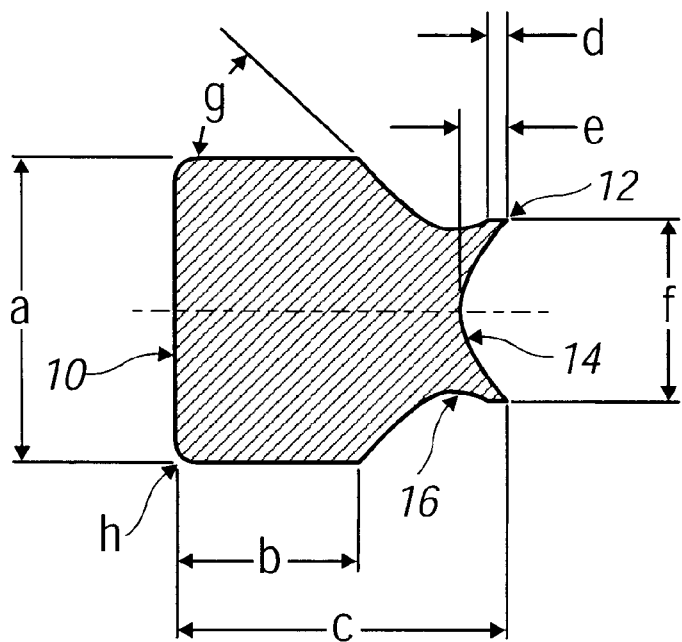
FIG. 1A shows a cross-section through the disclosed rock bit seal.

A cross-section of one embodiment of the disclosed seal is seen in FIG. 1A. The portion of the elastomeric seal which will be farthest from the dynamic surface, which shall be herein referred to as the base 10, has a squared shape, providing resistance to rolling or buckling within the gland. This base is currently sized to drop into the existing gland for an O-ring, although this is not necessary. (For example, in other applications, the elastomeric seal may fit against a backing ring, e.g. of metal or hard plastics, which is a close fit in a suitably shouldered bore.) At the dynamic surface, two lips 12 each come to a point to provide a sealing edge, while forming concave surface 14 between the lips, and concave surfaces 16 between each lip and the base.

The seal itself is molded from a homogenous elastomeric material, such as are used to form O-rings used in the same drilling applications.

Sample dimensions of a disclosed embodiment are as follows.

It will be understood by one of ordinary skill in the art that these dimensions reflect its use in a particular type and size of bit, and that these dimensions will change for other embodiments.

| Segment | Max (mm) | Min (mm) |
|---|---|---|
| Length a | 7.72 | 7.48 |
| Length b | 4.2 | 4.0 |
| Length c | 7.72 | 7.48 |
| Length d | 1.1 | 1.0 |
| Length e | 0.6 | 0.4 |
| Length f | 4.8 | 4.5 |
| Angle g | 45° | 45° |
| Radius h | 0.75 | 0.25 |
| Radius i | 1.5 | 1.0 |
| Radius j | 2.1 | 1.9 |

Figure 1B:
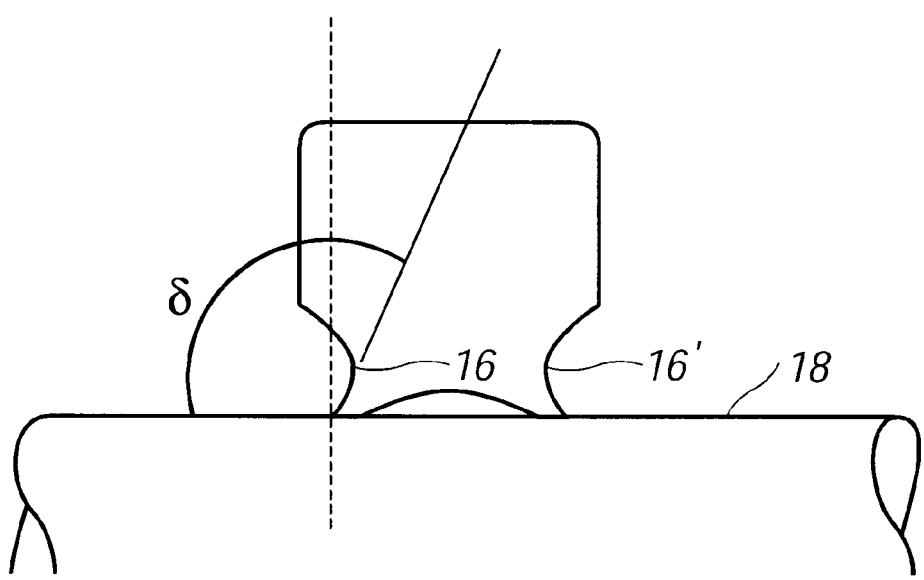
FIG. 1B show an angle of importance in the lip seal of FIG. 1A.

FIG. 1B shows an angle of importance in the lip seal of FIG. 1A, the seal being shown in contact with a sealing surface 18 of a shaft. In order to present a profile which does not encourage, and preferably discourages, the accretion of abrasive particles against the leading edge of the lip seal, the surface 16 of the seal facing towards the external environment presents an angle a (FIG. 1B) of not less than 90°, and preferably between 90° and 120°, although it could be as great as 150°. The surface, when inclined at an angle a greater than 90° acts as a wedge which deflects material impinging on it away from the shaft/seal interface. It will be appreciated that the overall aspect of the surface 16 presented to the ambient environment is that it is inclined away from the interface with the shaft surface 18, even if manufacturing or other considerations require the provision of a small chamber at the leading edge of the seal which may be at 90° to the shaft surface.

As illustrated, the seal has two oppositely directed surfaces 16, 16', one directed outwardly and facing the ambient environment and the other facing inwardly towards the region protected by the seal. Conveniently the seal may be of symmetrical cross-section, thereby removing the risk that it may be fitted "wrong way round" in the field, and furthermore facilitating management of the contact stress across the seal.

Figure 2A:
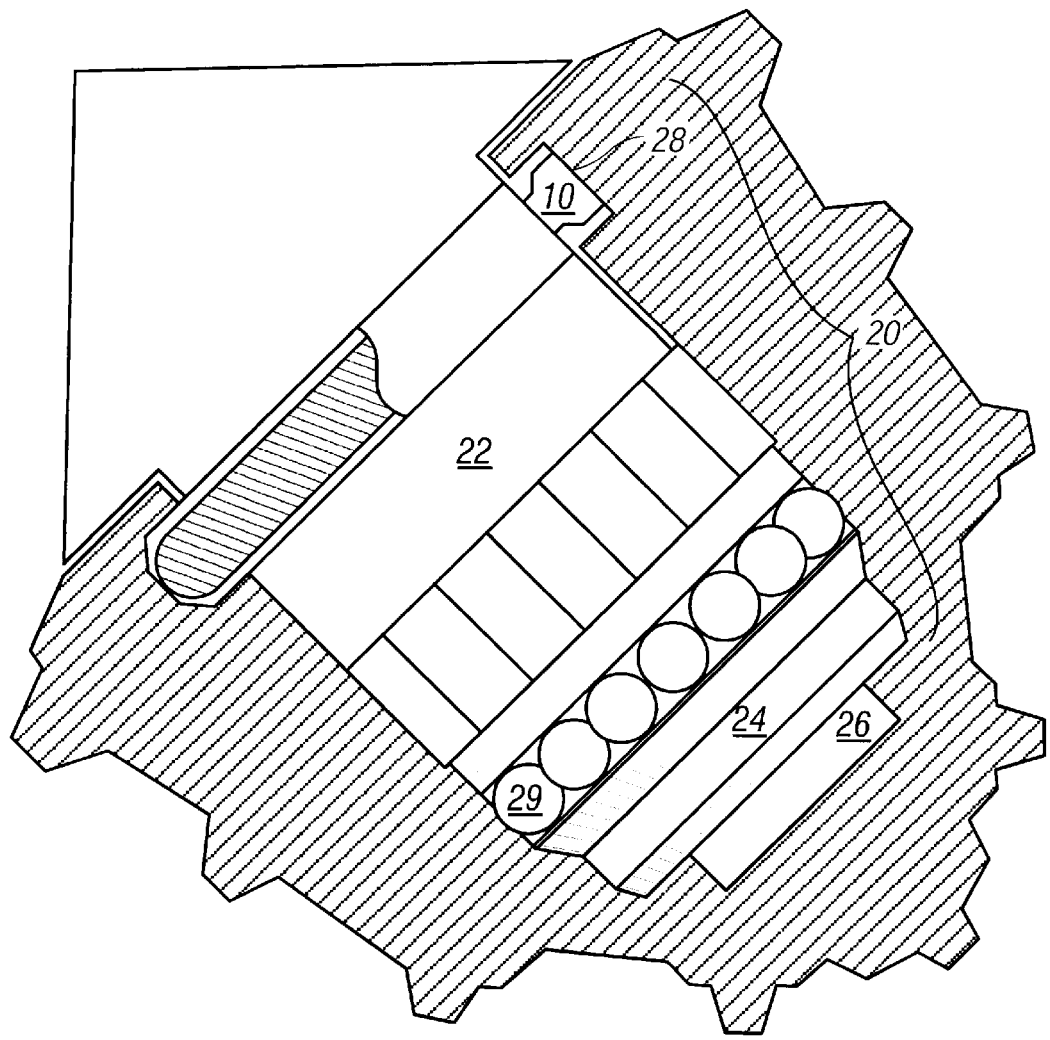
Figure 2B:
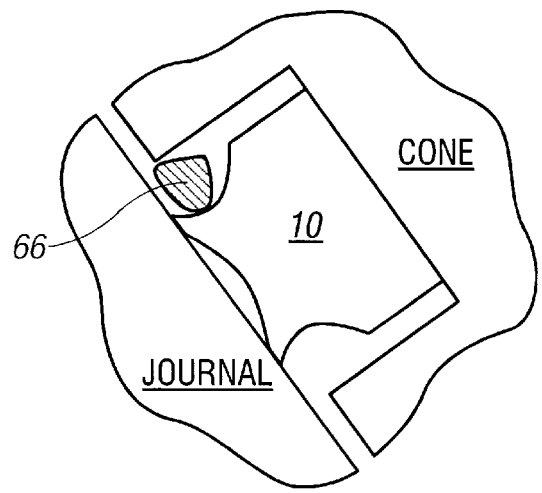
FIG. 2B shows a close-up of the installed seal, demonstrating the accumulation of abrasive materials away from the dynamic surface.
Figure 4A:
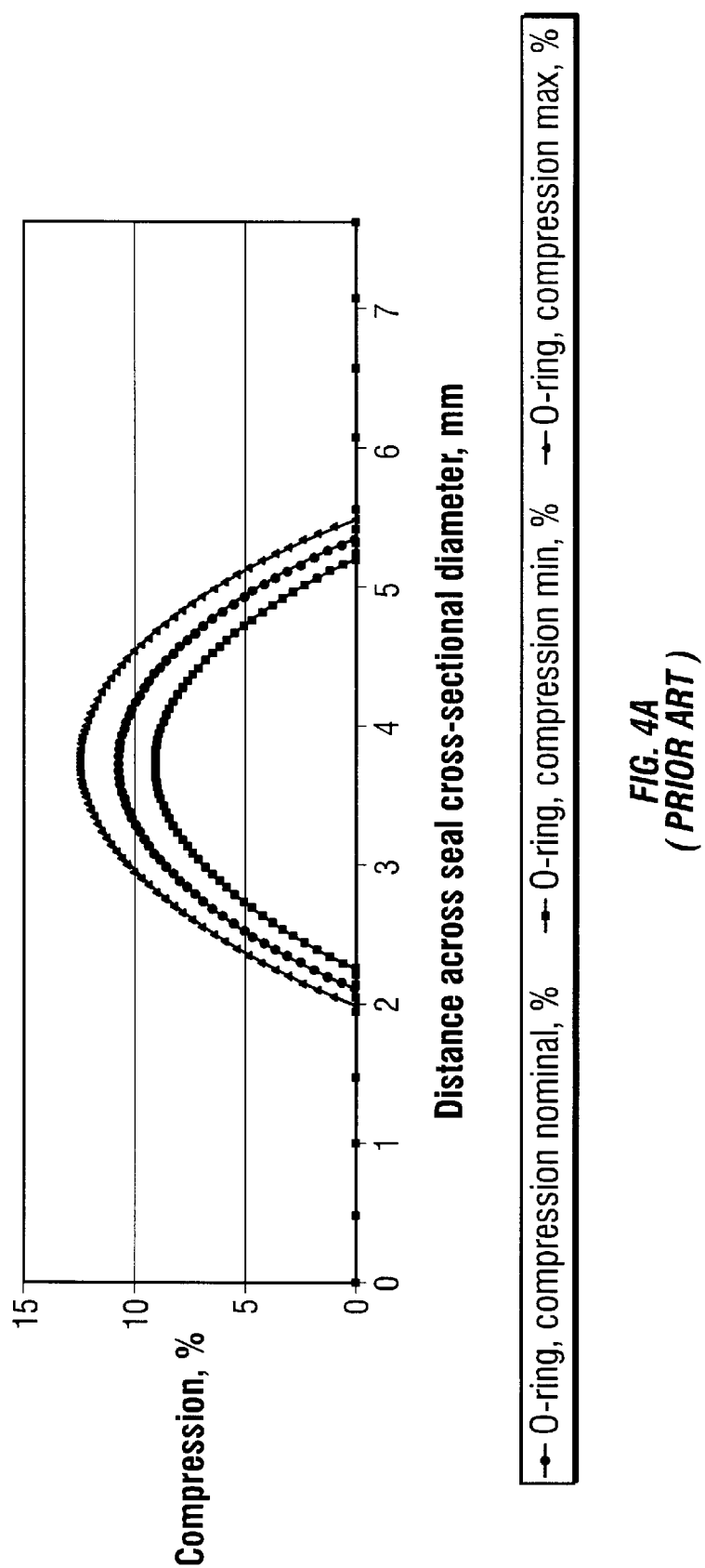
FIGS. 4A–B show a compression profile and a force profile for a normal O-ring seal.
Figure 4B:
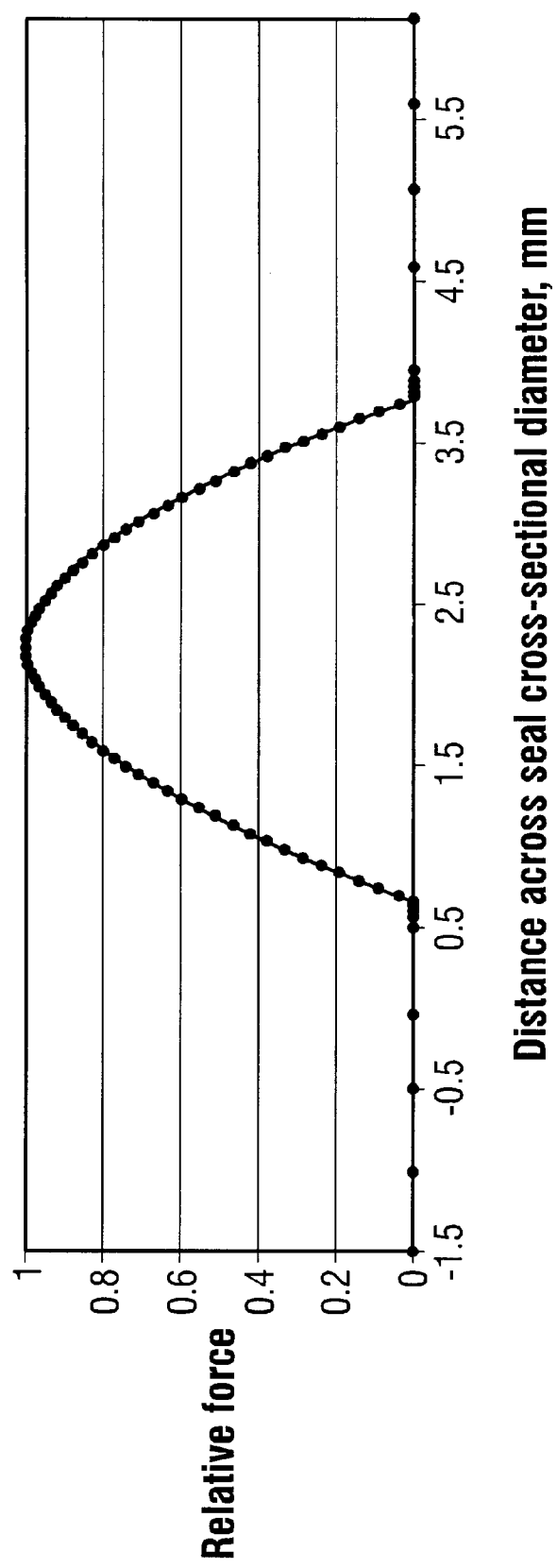
Figure 5:
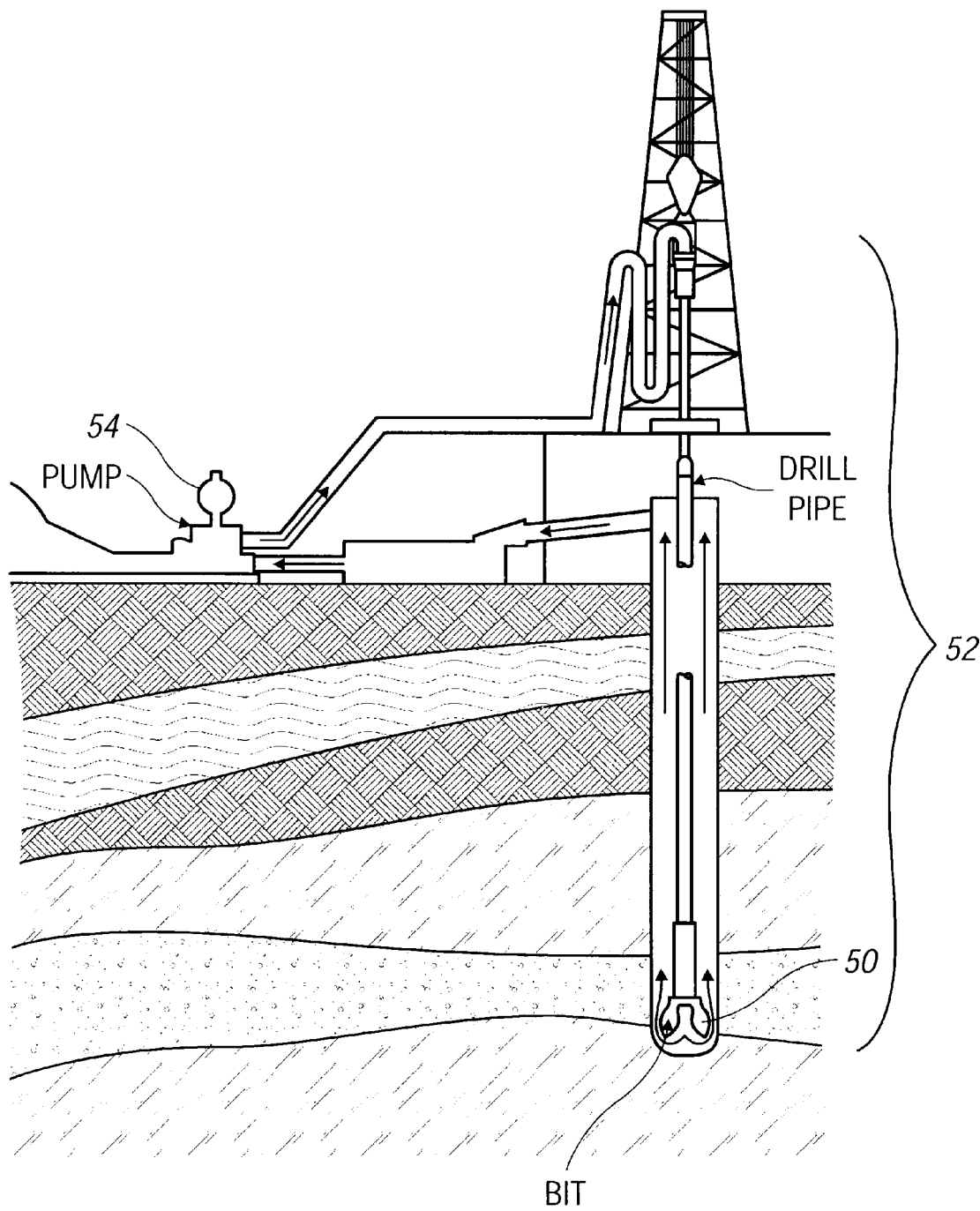
FIG. 5 shows a conventional drill rig.
Figure 7:
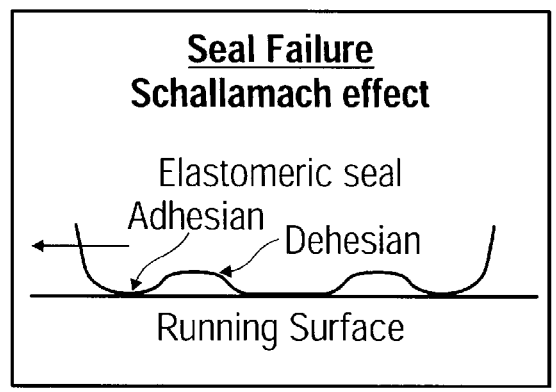
FIG. 7 shows a seal undergoing adhesive failure.
Figure 8:
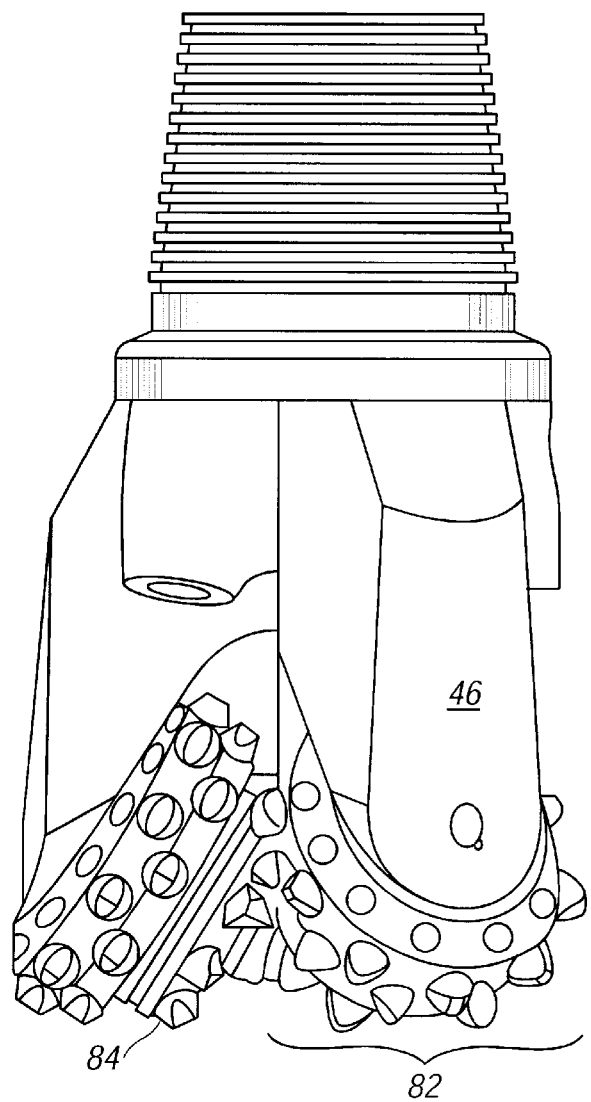
FIG. 8 shows roller cone bit.

FIG. 2A shows the disclosed seal with respect to the cone assembly. Spindle 20 contains journal bearing surface 22 and secondary journal bearing surfaces 24 and 26, as well as ball bearings 29. The cone, which is generally seen in outline, contains gland 28, in which is seated seal 10. FIG. 2B shows the gland 28 and seal 10 in close-up. The base of the seal is seated in a groove (gland) formed in the rotating cone. Similarly to O-rings, the disclosed seal is "oversized" for the gland, producing a compressive force on the seated seal. As seen in this figure, after the cone is mounted on the spindle, the lips of the seal are somewhat flattened, but still provide a sharp edge. Because the seal must be compressed between the cone and journal, the edges of the lips may be under some tensile stress, especially in the axial direction, although the overall stress is compressive. This figure also demonstrates how abrasive mass 66 is directed away from the sealing surface by the shape of the seal.

FIG. 3A shows the compression profile for the disclosed seal within the gland. This profile is very different from that of an O-ring, with compression at zero across the center of the seal lip contact band, and coming to a peak at the very edges of the seal. Similarly, the force profile for this seal, shown in FIG. 3B, is opposite to the O-ring, with the greatest force seen at the edge of the seal.

The disclosed seal is advantageous in that the high force at the edge of the seal is very effective in keeping out debris, even given the eccentric travel that the cone may make around the spindle. This is especially noteworthy since the sealing force for the disclosed seal is about 80% of o-ring sealing force when housed in the same housing. This reduced force helps decrease the friction and lowers wear.

Alternate Embodiment

In an alternate embodiment, concave area 14, which will form an enclosed space with the journal after installation, is filled with a lubricant, providing further protection of the seal, reducing running friction and power consumption and providing a further barrier to the ingress of drilling mud.

Alternate Embodiment

In an alternate embodiment, the seal material itself has self-lubricating and/or chemical properties which facilitate operation in the boundary lubrication regime.

The presently preferred embodiment includes both of the two alternate embodiments above.

Alternate Embodiment

In an alternate embodiment, the shape of the seal is modified so that there is a non-zero force at the center of the seal/journal interface, i.e., so that a void is not present between the lips, but the pressure is greater at the outside edges of the contact areas.

Alternate Embodiment

Page 150 of the "Seals and Sealing Handbook" mentioned above shows several configurations of lip seals used in other applications.

The present invention contemplates also the novel application of such seal in rock-drill (down hold) applications, contrary to the conventional belief that they are not suitable for such applications.

Definitions:

Following are short definitions of the usual meanings of some of the technical terms which are used in the present application. (However, those of ordinary skill will recognize whether the context requires a different meaning.)

Lip seal: A seal where the sealing surface is in the form of a flexible lip.

O-ring type seal: Used in this application to refer to a seal which has a force profile similar to an O-ring, where the maximum force is exerted at the center of the sealing surface, with decreasing force near the edges of the seal.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, the exact shape shown is not necessary; many variations are possible which still have the exclusion point at the edge of the seal/journal interface.

For another example, the disclosed inventions are not strictly limited to use with a cylindrical sealing surface, but can also be adapted for use with a conical or other tapered sealing surface.

In a further class of alternative embodiments, it is also contemplated that the disclosed inventions can be implemented as a face seal.

The invention also can be used in applications additional to the rock drill bits and rock drill joints specifically described.

Each feature disclosed in this specification (which term includes the claims) and/or shown in the drawings may be incorporated in the invention independently of other disclosed and/or illustrated features.

According to a disclosed class of innovative embodiments, there is provided: A rotary drill bit, comprising: a toothed rotating element rotatably mounted, through a bearing, to a main portion of the bit; and a seal which isolates said bearing from an ambient environment of drilling fluid, said seal having at least one portion which operates by lip-seal-type sealing and not by O-ring-type sealing.

According to another disclosed class of innovative embodiments, there is provided: A rotary drill bit, comprising: a toothed rotating element rotatably mounted, through a bearing, to a main portion of the bit; and a seal which forms a dynamic interface to a sealing surface to isolate said bearing from an ambient environment of drilling fluid; said seal having a force profile which completely excludes said ambient environment from said dynamic interface.

According to another disclosed class of innovative embodiments, there is provided: A rotary drill bit, comprising: a toothed rotating element rotatably mounted, through a bearing, to a main portion of the bit; and a seal which forms a dynamic interface to a sealing surface to isolate said bearing from an ambient environment of drilling fluid; said seal having an area, in contact with said sealing surface, which is bounded by an acute angle.

According to another disclosed class of innovative embodiments, there is provided: A rotary drill bit, comprising: a toothed rotating element rotatably mounted, through a bearing, to a main portion of the bit; and a seal which forms a dynamic interface to at least one sealing surface to isolate said bearing from an ambient environment of drilling fluid; said seal having two separate areas in contact with separate respective portions of said sealing surface, each said area being bounded by an edge of said seal which, in section, defines an angle of 120 degrees or sharper.

According to another disclosed class of innovative embodiments, there is provided: A rotary drill bit, comprising: a toothed rotating element mounted, through a bearing, to rotate around a journal; a seal which forms a dynamic interface between said toothed rotating element and said journal, to isolate said bearing from an ambient environment of drilling fluid, said seal having a base portion and a lip portion; wherein a compression profile of said lip portion of said seal when installed shows maximum compression at the outermost edge of said lip portion.

According to another disclosed class of innovative embodiments, there is provided: A rotary rock drill bit, comprising: a rotating cone which rotates around a fixed journal; a seal, seated in a gland in said cone, said seal having a dynamic interface with said journal when in operation; wherein accumulations of material do not form at the dynamic interface of said seal and said journal, but at locations away from said dynamic interface.

According to another disclosed class of innovative embodiments, there is provided: A sealed rotary rock drill joint, comprising: a seal, a gland, and a sealing surface, said seal being seated in said gland and pressed against said sealing surface; wherein said seal has at least one portion which operates by lip-seal-type sealing and not by O-ring-type sealing.

According to another disclosed class of innovative embodiments, there is provided: A rotary drilling system, comprising: a drill string which is attached to a drill bit; a rotary drive, connected to said drill string to rotate said drill string; a pump to force drilling fluid through said drill string; wherein said drill bit has a bearing seal which has a force profile similar to a lip seal.

According to another disclosed class of innovative embodiments, there is provided: A method of rotary drilling, comprising the steps of: (a.) installing a drill bit, having a bearing seal which is a lip seal, onto a drill string; (b.) rotating said drill string to fragment materials in contact with said drill bit; (c.) removing fragments created by the rotation of said drill string; whereby the average useful life of said drill bit is increased over a drill bit using an O-ring type seal.

According to another disclosed class of innovative embodiments, there is provided: A method of assembling a rotary cone bit, comprising the steps of: (a.) installing cones onto the spindles of said rotary cone bit; (b.) installing respective bearing seals, which are lip seals, to protect the bearing surfaces of said cones and said spindles.

According to another disclosed class of innovative embodiments, there is provided: A seal to prevent fluid passage in a gap between two mutually rotating parts, comprising: a body, capable of forming a static seal with the first of the two mutually rotating parts; two lips extending from said body, said lips being capable of forming a dynamic seal with the second of the two mutually rotating parts; said body and said lips being formed of a homogenous elastomeric material.

According to another disclosed class of innovative embodiments, there is provided: An assembly comprising two relatively rotatable parts disposed to define a gap therebetween and a seal structure in the gap, said seal structure forming a static seal with a first of said parts and having a first lip forming a dynamic seal with a second of said parts, said seal structure being under a compressive pre-load to maintain said dynamic seal.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

What is claimed is:

1. A rotary drill bit, comprising:
   a toothed rotating element rotatably mounted, through a bearing, to a main portion of the bit; and
   a seal which isolates said bearing from an ambient environment of drilling fluid, said seal having at least one portion, which faces toward the ambient environment, which operates by lip-seal-type sealing and not by O-ring-type sealing.

2. The bit of claim 1, wherein said seal is made of a self-lubricating elastomer composition.

3. The bit of claim 1, wherein said seal is a lip seal.

4. The bit of claim 1, wherein said teeth are button-shaped.

5. The bit of claim 1, wherein said teeth are pointed.

6. The bit of claim 1, wherein said seal portion is bounded by a surface facing towards the ambient environment and inclined away from the sealing surface.

7. A rotary drill bit, comprising:
   a toothed rotating element rotatably mounted, through a bearing, to a main portion of the bit; and
   a seal which isolates said bearing from an ambient environment of drilling fluid, said seal having at least one portion which operates by lip-seal-type sealing and not by O-ring-type sealing;
   wherein said seal portion is bounded by a surface facing towards the ambient environment which defines with the sealing surface an angle of not less that 90°, and preferably between 90° and 120°.

8. A rotary drill bit, comprising:
   a toothed rotating element mounted, through a bearing, to rotate around a journal;
   a seal which forms a dynamic interface between said toothed rotating element and said journal, to isolate said bearing from an ambient environment of drilling fluid, said seal having a base portion and a lip portion;
   wherein a compression profile of said lip portion of said seal when installed shows maximum compression at the outermost edge of said lip portion.

9. The bit of claim 8, wherein said seal is made of a self-lubricating elastomer composition.

10. The bit of claim 8, wherein said seal is a lip seal.

11. The bit of claim 8, wherein said teeth are button-shaped.

12. The bit of claim 8, wherein said teeth are pointed.

* * * * *